Patented Jan. 17, 1950

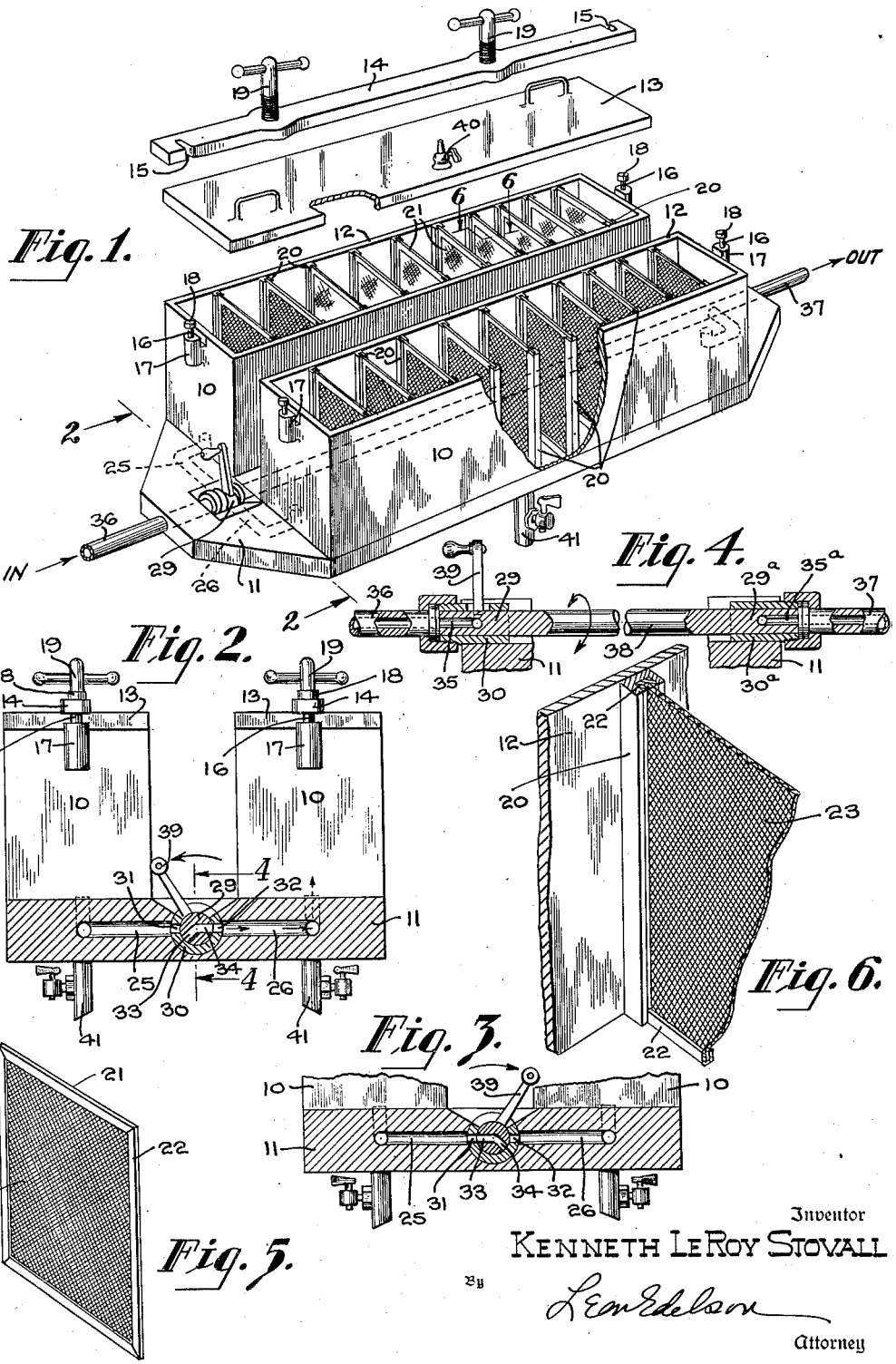

2,495,031

UNITED STATES PATENT OFFICE 2,495,031

OIL FILTER UNIT

Kenneth LeRoy Stovall, Coos Bay, Oreg.

Application October 16, 1947, Serial No. 780,234

1 Claim. (Cl. 210—178)

This invention relates to filters and more particularly to an improved design and construction of filter unit especially adapted for use in connection with the filtering and purification of oil employed in Diesel and internal combustion engines.

Among the principal objects of the present invention is to provide a simple and efficient oil filtering apparatus having a pair of identical filter units so operatively associated in the apparatus that they may be alternatively employed, whereby when it becomes necessary to clean or otherwise service one of the units the other may be continued in operation.

A further object of the present invention is to provide in each unit of the oil filtering apparatus a plurality of readily removable filtering screens, the mounting of said screens within the unit being such as to facilitate expeditious removal and replacement of the screens whenever the necessity therefor arises, each filtering screen being in the form of a simple structure which is inexpensive and economical to manufacture.

Other objects and advantages of the invention will appear more fully hereinafter, it being understood that said invention consists substantially in the combination, construction, location and relative arrangement of parts, all as described in detail hereinafter, as shown in the accompanying drawings and as finally pointed out in the appended claims.

In the accompanying drawings which illustrate a preferred construction of oil filter apparatus embodying the principles of the present invention.

Figure 1 is a perspective view of the apparatus showing the lid of one of the filter units separated therefrom;

Figure 2 is a transverse view of the apparatus as taken on the line 2—2 of Figure 1;

Figure 3 is a view corresponding to the lower portion of Figure 2 showing the control valve in its alternative position;

Figure 4 is a view, partially in section, showing the control valve mechanism for the apparatus;

Figure 5 is a perspective of one of the filter screen elements; and

Figure 6 is a perspective view in enlarged scale showing the mounting of the filter screen element in the filter unit as viewed along the line 6—6 of Figure 1.

Referring now to the drawings, and more particularly to Figure 1 thereof, it will be observed that the filter apparatus of the present invention generally consists of a pair of filter units 10—10 commonly mounted upon a suitable base 11, the units 10—10 being in the form of rectangular casings 12—12 disposed in laterally spaced, substantial parallel relation. Each of the casings 12—12 is substantially closed upon all but the top sides thereof, the open top of each casing being normally closed by a removable closure lid 13 which is adapted to be firmly pressed into closed position, as shown in Figure 2, by means of a longitudinally extending closure bar 14 having oppositely presenting notches 15—15 respectively formed adjacent opposite ends of the bar. These notches 15—15 respectively embrace the shanks 16—16 of lugs 17—17 suitably secured to opposite ends of each casing 12, each lug being provided with an enlarged head 18 adapted to overlie the upper surface of the bar 14 to limit vertical displacement of the latter. The bar 14 is fitted with a pair of screw elements 19—19 which are manually operable for axial adjustment toward and away from the upper surface of the closure lid 13 when the latter is disposed between its casing 12 and the bar 14. It will be apparent that upon axially adjusting the screw elements 19—19 toward the lid 13 while the bar 14 is engaged with the lugs 17—17 considerable downward pressure is exerted against the lid 13 to seat it firmly against the top of its associated casing 12 and so seal the latter against escape of oil therefrom during operation of the apparatus.

Each casing 12 of the apparatus is internally provided with a plurality of longitudinally spaced pairs of vertically extending channel members 20 suitably secured to the inner surfaces of the casing side walls. Each pair of these channel members 20 form a guideway for accommodating therebetween a removable filter element 21. As most clearly appears in Figures 5 and 6, each filter element 21 comprises a quadrangular frame 22 formed of suitably rigid material, such as metal, the frame opening being fitted with a more or less tautly stretched filter fabric 23 of any desired material suitable for the purpose, such as cotton mesh. It will be apparent that the filter elements 21 are each readily insertable into and removable from their channel guides 20—20 fixed in the casings 12—12 and that when said elements are mounted in a casing with the closure lid thereof tightly sealed thereon they provide a series of longitudinally spaced, substantially parallel screens for filtering the oil as it passes therethrough.

In order to provide for alternative use of the filter units 10—10, valve-controlled conduits are provided at opposite ends of the apparatus, each such conduit including a pair of oppositely extending passages formed, for example, in the base 11 of the apparatus, for respective communication with the interiors of the casings 12—12. Thus, the oil inlet conduit includes a pair of passages 25 and 26 which respectively communicate with the interior of the casings 12—12 at the forward ends thereof, while the oil outlet conduit includes a corresponding pair of passages which respectively communicate with the interior of the casings at the rear end thereof.

Operatively associated with the oil inlet conduit is a two-way valve member 29 suitably journalled in a sleeve 30 fitted in the base 11, said sleeve having ports 31—32 respectively in communication with the inlet passages 25 and 26. The valve member 29 is formed with angularly related passages 33—34 commonly in communication with an axial passage 35 leading to the oil inlet conduit 36, the passages 33—34 being adapted for selective registry, respectively, with the ports 31—32 of the valve sleeve 30.

In similar manner, a two-way valve member 29a is operatively associated with the oil outlet conduit, said valve member being rotatably mounted in a sleeve 30a fitted in the rear end of the base 11. This sleeve 30a is provided with ports respectively in communication with the outlet passages from the casings 12—12. As in the case of the valve member 29, the valve member 29a is also formed with angularly related passages commonly in communication with an axial passage 35a leading to the oil discharge conduit 37.

As most clearly appears in Figure 4, the valves 29 and 29a are interconnected for simultaneous operation by a shaft 38 extending therebetween, the inlet valve 29 being fitted with an operating handle 39. In operation of the apparatus, this handle 39 is initially thrown into one or the other of its two extreme positions as shown in Figures 2 and 3, thereby placing in operation one or the other of the filter units 10—10. Thus, when the handle 39 is shifted into the position shown in Figure 2, only the right hand filter unit is operative for the passage of oil therethrough, the valves 29 and 29a being closed against passage of oil into and through the left hand unit. Conversely, when the handle 39 is shifted into the position shown in Figure 3, only the left hand unit is operative for the passage of oil therethrough. In normal operation of the apparatus, the oil to be filtered enters that one of the units which is in operation, is therein filtered as it passes through the filter elements 21 thereof, and in filtered state is then discharged from the filter unit for use as desired, as for instance, in the injection pump of an oil engine. Any excessive pressure that may be developed in the oil filter during passage of oil therethrough may be relieved by way of a relief valve 40 suitably fitted in the closure lid 13. The sediment contained in the oil and which is filtered therefrom solely by the filter screens gradually accumulates in the bottom of the filter casing.

When it becomes necessary to clean a filter unit of the apparatus of the accumulated debris and sediment contained in the oil passed therethrough, the valve 29 is operated to throw into operation the other filter unit, following which the closure lid 13 of the unit to be cleaned is lifted to permit removal of all of the filter elements from the unit for such cleaning and servicing thereof as may be necessary. The sludge accumulated in the bottom of the casing is then flushed out by way of the discharge fitting 41 provided in the bottom of the casing, whereupon when the screens are replaced and the closure lid is reseated in sealed position the unit is again ready for operation.

It will be understood, of course, that the present invention is susceptible of various changes and modifications which may be made from time to time without departing from the general principles or real spirit thereof, and it is accordingly intended to claim the same broadly, as well as specifically, as indicated in the appended claim.

What is claimed as new and useful is:

In a filter apparatus of the character described, a pair of filter units respectively in the form of identical rectangular casings disposed in laterally spaced, parallel relation, a common base for supporting said casings, a plurality of interchangeable and replaceable filter elements disposed in longitudinally spaced, parallel relation within the interior of each casing and extending transversely across the direction of flow of a liquid therethrough, means for removably supporting said filter elements within each casing, a top closure member adapted to be removably secured to each casing to close the same and lock said filter elements operatively within said casing, each of said casings being provided at opposite ends thereof with fluid inlet and outlet openings respectively in communication with passages formed in said common base for said casings, valve means located at each end of said filter apparatus for opening the fluid inlet and outlet passages of one casing while simultaneously closing those of the other, and means for synchronously actuating said valve means including a shaft extending longitudinally through said base from one valve means to the other and an operating handle accessible at one end of the apparatus for rotating said shaft to render operative at any one time only one of said filter units.

KENNETH LE ROY STOVALL.

REFERENCES CITED

The following references are of record in the file of this patent:

UNITED STATES PATENTS

| Number | Name | Date |
| --- | --- | --- |
| 1,842,990 | Lentz | Jan. 26, 1932 |
| 1,910,747 | Burhams | May 23, 1933 |
| 2,144,444 | Victor | Jan. 17, 1939 |
| 2,333,609 | Widman | Nov. 2, 1943 |